Dec. 11, 1962   J. J. BARRETT ET AL   3,067,892
BOAT TRAILER
Filed Jan. 29, 1960   2 Sheets-Sheet 1
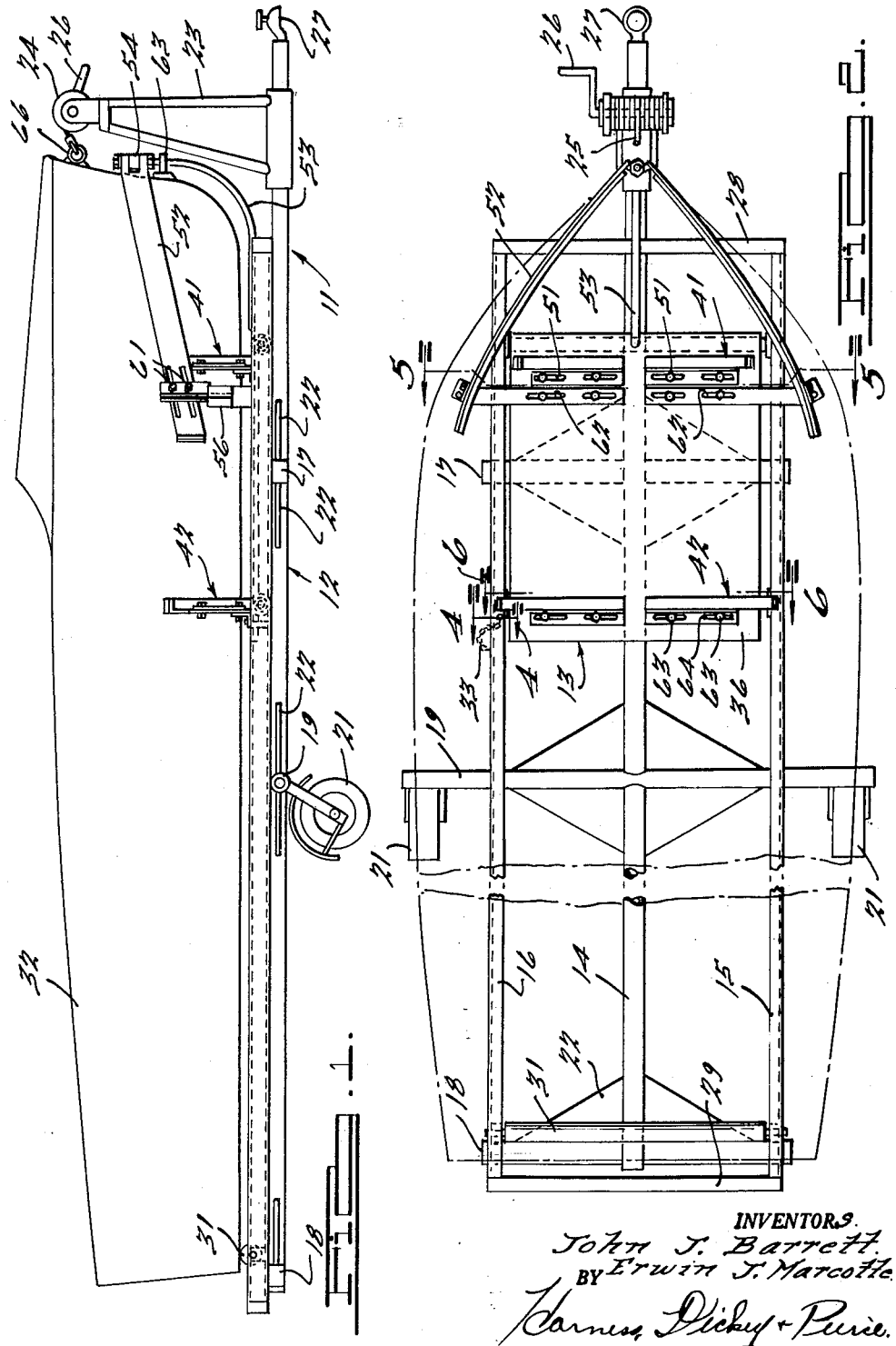
INVENTORS.
John J. Barrett
BY Erwin J. Marcotte
Harness, Dickey & Pierce
ATTORNEYS

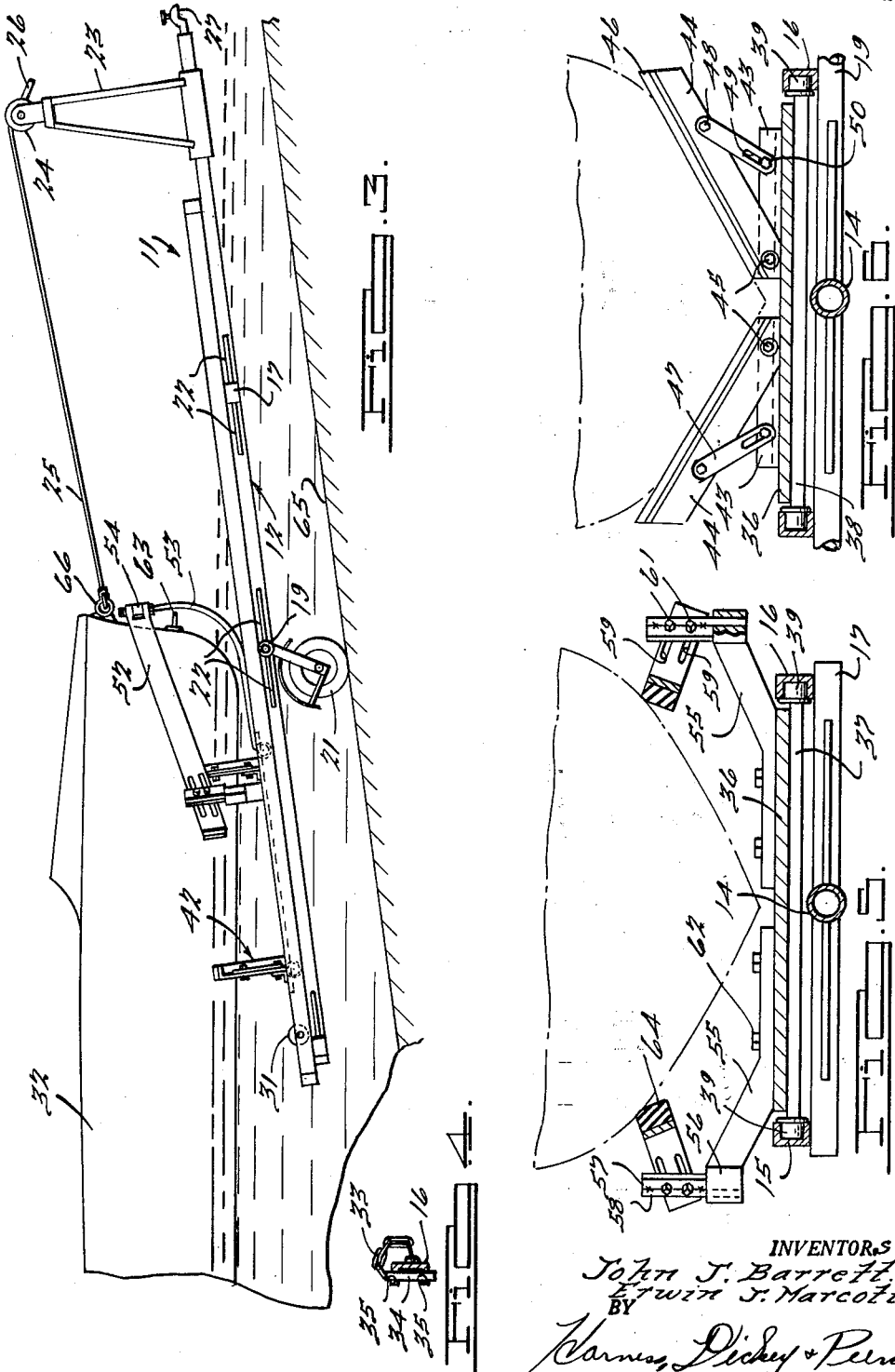

United States Patent Office 3,067,892
Patented Dec. 11, 1962

3,067,892
BOAT TRAILER
John J. Barrett, 7235 Engleman Ave., Center Line, Mich., and Erwin J. Marcotte, 20212 Northline, Taylor, Mich.
Filed Jan. 29, 1960, Ser. No. 5,530
4 Claims. (Cl. 214—506)

This invention relates to boat trailers, and more particularly to trailers adapted to be hauled by automotive vehicles and which may serve to launch a boat directly into the water as well as to load the boat directly from the water back onto the trailer.

It is an object of the invention to provide a novel and improved boat trailer which enables a single person to launch, load or transport a pleasure craft with a minimum of difficulty and with complete safety.

It is a further object to provide an improved boat trailer of this character which will hold the boat in firm alignment with the trailer while the boat is still in the water, thus facilitating loading or launching of the boat despite strong cross-currents or winds which might otherwise hamper operation or endanger the boat or its occupants.

It is another object to provide an improved trailer construction of this nature which is adaptable to many different types of trailers for carrying small or large boats, and which may be adjusted to boat hulls of varying shapes.

Other objects, features, and advantages of the present invention will become apparent from the subsequent description, taken in conjunction with the accompanying drawings.

FIGURE 1 is a side elevational view of a boat trailer embodying the principles of this invention, the trailer being shown with a boat in loaded position;

FIGURE 2 is a top plane view of the trailer shown in FIGURE 1, illustrating the configuration of the frame and adjustable bow guides;

FIGURE 3 is a view similar to FIGURE 1, showing the trailer with a boat in launched position;

FIGURE 4 is a fragmentary cross-sectional view in elevation taken along the line 4—4 of FIGURE 2 and showing the safety locking pin for the carriage;

FIGURE 5 is a view taken along the line 5—5 of FIGURE 2, and showing the means for adjustably supporting the bow guides; and FIGURE 6 is a cross-sectional view in elevation taken along the line 6—6 of FIGURE 2 and showing the adjustable rear cradle.

In general terms, the invention comprises a boat trailer having an elongated rectangular frame with a pair of spaced parallel tracks, these tracks supporting a flat carriage for movement therealong. The frame is adapted to be secured to the trailer hitch of an automotive vehicle and carries a winch at the forward end thereof. The carriage is movable between the forward and rear ends of the frame, and has a front cradle and a rear cradle thereon, these cradles being adjustably constructed and adapted to support the hull of a boat at longitudinally spaced areas. A retainer bar extends forwardly and upwardly from the carriage, and supports a pair of adjustable bow guides which extends rearwardly in flared relation from the retainer bar. When loaded, the boat is supported by the front and rear cradles and the bow thereof is held between the bow guides. To launch the boat, the rear portion of the trailer is submerged and the carriage permitted to roll rearwardly until the boat is water-borne, after which is may be withdrawn from the cradles and bow guides. To load the boat, it is propelled into position above the cradles and within the bow guides, and the carriage and boat are then moved together on the tracks to the forward end of the trailer.

The boat is thus held in firm alignment with the trailer during boat launching and loading.

Referring more particularly to the drawings, the boat trailer is generally indicated at 11 and comprises a frame assembly generally indicated at 12 and a carriage assembly generally indicated at 13. The frame assembly comprises a longitudinal central frame member 14 of tubular shape and a pair of channel-shaped tracks 15 and 16. Frame member 14 carries a plurality of cross-members for supporting the tracks, including a forward cross-member 17, a rear cross-member 18, and a tubular central cross-member 19 at an intermediate portion of the frame. Member 19 is adapted to support a pair of resiliently mounted wheel assemblies 21 at the outer ends thereof. Gusset plates 22 are provided between central frame member 14 and members 17, 18 and 19 for reinforcing purposes. The forward end of member 14 carries a stand 23 extending upwardly therefrom, the upper end of this stand having a winch 24 with a cable 25 and a hand crank 26. A trailer hitch coupling member 27 is mounted at the forward end of frame member 14 for attachment to the trailer hitch (not shown) of an automotive vehicle or other tractor.

Tracks 15 and 16 are of channel-shaped cross-secton, as seen in FIGURES 5 and 6, and are secured in spaced parallel relation on members 17, 18 and 19, so as to constitute tracks for carriage 13. A forward cross-member 28 and a rear cross-member 29 are secured to the ends of tracks 15 and 16 as seen in FIGURE 2. A roller 31 is rotatably mounted adjacent rear cross-member 29, the upper surface of this roller extending above the upper surfaces of tracks 15 and 16 so that the roller may serve to support the keel at the after portion of a boat 32 when the latter is loaded onto the trailer. A chain 33 has one end secured to an intermediate portion of track 16 as seen in FIGURES 2 and 4, the other end of this chain carrying a pin 34 adapted to pass through aligned apertures 35 in track 16 for retaining carriage 13 in its loaded position.

Carriage 13 comprises a platform 36 of generally rectangular shape, with a pair of axles 37 and 38 secured beneath the forward and rear portions of the platform and carrying rollers 39 disposed within tracks 15 and 16. The platform carries a forward cradle generally indicated at 41 and a rear cradle generally indicated at 42 in FIGURE 1. Each of these cradles has a pair of spaced aligned angle members 43 secured to the upper surface of platform 36 and extending transversely thereof, and a pair of cradle members 44 pivoted at 45 to the inner ends of members 43 and extending upwardly and outwardly therefrom. Members 44 may likewise be of angular cross-sectional shape and carry pads 46 for engaging the boat hull. Braces 47 are pivotally secured at 48 to the outer portions of members 44 and extend downwardly to the outer portions of members 43. Braces 47 have slots 49 for receiving clamping bolts 50 passing through members 43. The angular disposition of cradle members 44 may thus be adjusted in accordance with the shape of the boat hull. Members 43 are likewise secured to platform 36 by bolt-and-slot connections 51 and are adjustable laterally for different hull widths.

A pair of bow guides 52 are provided for receiving the bow of boat 32. The forward ends of these bow guides are supported by a curved retaining member 53 secured to and extending forwardly from the forward end of platform 36. Member 53 is curved forwardly and upwardly, and bow guides 52 are pivotally connected at 54 to the upper ends of member 53. The bow guides are of flat cross-sectional shape and are slightly curved, as seen in FIGURE 2, to conform to the bow configuration.

Means are provided for supporting the rear ends of bow guides 52, this means including a pair of brackets 55 secured to the upper surface of platform 36, as seen in FIGURE 5, brackets 55 extending in an inclined manner upwardly and outwardly from the platform. Pivot supports 56 are formed at the outer ends of brackets 55, and bow guide supporting plates 57 are disposed above pivot portions 56, these supporting plates carrying pivot rods 58 secured thereto and retained by pivot supports 56. The rear ends of bow guides 52 have a pair of slots 59, and a pair of clamping bolts 61 extend through plates 57 and slots 59. Bolt-and-slot connections 62 are provided between brackets 55 and platform 36, so that the brackets may be adjustably secured to platform 36 in a variety of lateral positions. It will thus be seen that the angular spacing of bow guides 52 may be preselected in accordance with the bow shape.

If desired, a conventional latch type of coupling 63 may be mounted on the prow of boat 32 or on member 53, so that when the boat is loaded onto platform 13 it may be securely latched to member 53. Preferably, latch 63 is of a type which may be manually released when desired.

In operation, boat trailer 11 will be adjusted in accordance with the boat 32 which it is to handle by adjusting cradles 41 and 42 as well as bow guides 52. As indicated previously, cradles 41 and 42 may be adjusted for width by means of bolt-and-slot connections 51, the angularity of cradle members 44 being adjusted by clamping bolts 50 and slots 49 in members 47. Bow guides 52, which are preferably provided with pads 64, may likewise be adjusted in width by means of bolt-and-slot connections 62 as well as by bolts 61 and slots 59.

Assuming that boat 32 is initially in the position shown in FIGURE 1, the boat may be launched by backing trailer 11 down a ramp indicated schematically at 65 in FIGURE 3 until the rear portion of frame 12 is submerged beneath water level. If a latch 63 is used, this may be released at this time. Winch 24 may then be released, permitting boat 32 and carriage 13 to roll down tracks 15 and 16, pin 33 having previously been withdrawn. The boat will be supported during this movement by roller 31, and as carriage 13 reaches the rear portion of the frame the boat will become water-borne. Preferably, the boat painter should be held securely by the operator while the boat is moving into the water. Upon being water-borne, the boat may be withdrawn from carriage 13. It should be noted however, that while the boat is disposed within cradles 41 and 42 as well as bow guides 52, it will be restrained against lateral movement which might occur due to cross-currents or high winds. The boat will thus be under complete control until it is moved away from the trailer, this being done after cable 25 is disconnected from eye 66 secured to the bow of the boat. Platform 13 will be prevented from leaving tracks 15 and 16 by roller 31.

When it is desired to load boat 32 onto trailer 11, carriage 13 will be moved to the rear of frame 12, the trailer backed into the water until its rear portion is submerged as seen in FIGURE 3, and cable 25 extended. Boat 32 may be propelled forwardly until its bow enters between bow guides 52 and its hull is above cradles 41 and 42. Cable 25 may then be secured to eye 66. Here again, it will be observed that as soon as boat 32 is within bow guides 52 and cradles 41 and 42, it will be held in substantial alignment with tracks 15 and 16 despite forces which might otherwise tend to swing it out of alignment. Upon cranking of handle 26, the boat will be moved forwardly, along with carriage 13, roller 31 supporting the boat as is moves forwardly. The cranking will continue until the boat reaches the position shown in FIGURE 1. If a latch 63 is provided, this may be secured to member 53, and locking pin 33 will be inserted in track 16 to prevent carriage 13 from rolling rearwardly. The boat will then be fully loaded on the trailer and ready for transportation.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a boat trailer, an elongated wheeled frame, a carriage movably mounted on said frame, cradle means carried by said carriage and adapted to engage a boat hull a substantial distance above the keel and rearwardly of the bow, bow guide means carried by the forward portion of said carriage, said bow guide means including a member extending upwardly from the forward end of said carriage, and a pair of rearwardly flared bow guides pivoted at their forward ends to said upwardly extending member, extending rearwardly and secured at their rear portions to said carriage, the rear portions of said guides being mounted for lateral adjustment.

2. In a boat trailer, an elongated wheeled frame, a carriage movably mounted on said frame, cradle means carried by said carriage and adapted to engage a boat hull, bow guide means carried by the forward portion of said carriage, said bow guide means including a member extending upwardly from the forward end of said carriage, a pair of flared bow guides pivoted to the upper end of said member and extending rearwardly therefrom, a pair of brackets extending laterally outwardly from said carriage, means for adjusting said brackets in a lateral direction, and means for adjustably securing the rear ends of said bow guides to the outer ends of said brackets.

3. The combination according to claim 2, said last-mentioned means including a pair of vertically pivoted plates carried by the outer ends of said brackets, and bolt-and-slot connections between said plates and the rear portions of said bow guides.

4. In a boat trailer, an elongated wheeled frame, a non-buoyant carriage movably mounted on said frame, said carriage being substantially shorter than said frame and movable between a first position at the forward end of said frame and a second position at the rearward end of said frame, the carriage being fully supported by said frame in both positions, a bow guide carried by the forward portion of said carriage and including a pair of rearwardly flared members simultaneously engageable with the sides of a boat hull adjacent the bow and a substantial distance above the keel, and a cradle mounted on and movable with said carriage, said cradle being spaced a substantial distance rearwardly of the rear ends of said bow guide members, the cradle being simultaneously engageable with opposite sides of the boat hull a substantial distance above the keel.

References Cited in the file of this patent

UNITED STATES PATENTS

| | | |
|---|---|---|
| 2,485,793 | Vassar | Oct. 25, 1949 |
| 2,799,416 | Balko et al. | July 16, 1957 |
| 2,827,304 | Backus | Mar. 18, 1958 |
| 2,917,194 | Streater | Dec. 15, 1959 |
| 3,009,589 | Martz | Nov. 21, 1961 |